Feb. 9, 1926.

N. S. LINCOLN

BRAKE

Filed Sept. 9, 1922

1,572,862

2 Sheets-Sheet 1

INVENTOR.
Neil S. Lincoln,
BY
ATTORNEY.

Feb. 9, 1926. 1,572,862
N. S. LINCOLN
BRAKE
Filed Sept. 9, 1922 2 Sheets-Sheet 2
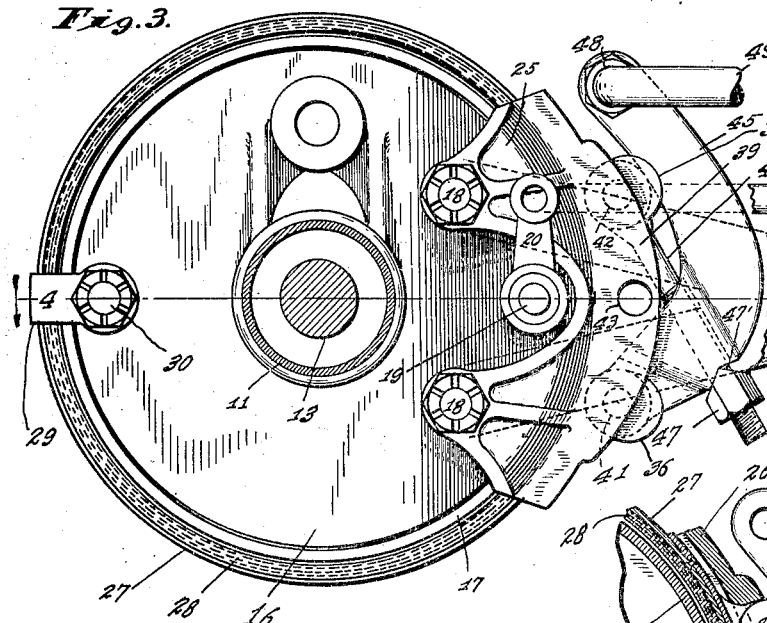
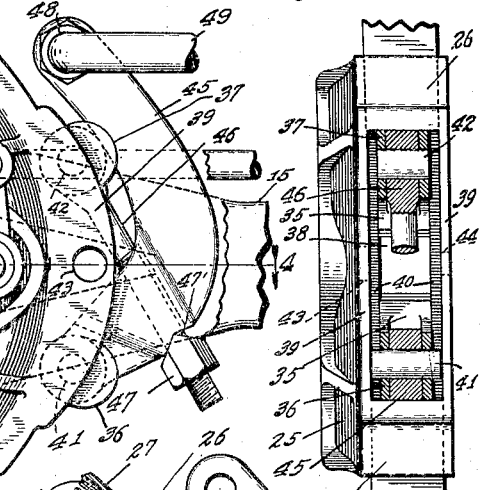
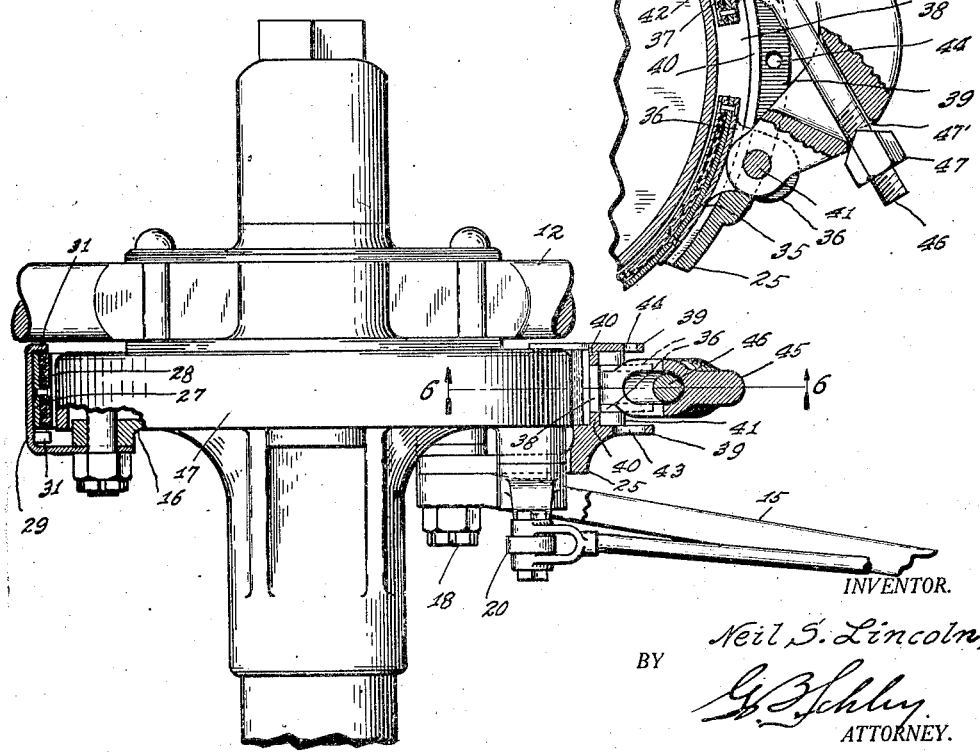
INVENTOR.
Neil S. Lincoln,
BY
ATTORNEY.

Patented Feb. 9, 1926.

1,572,862

UNITED STATES PATENT OFFICE.

NEIL S. LINCOLN, OF CONNERSVILLE, INDIANA, ASSIGNOR TO LINCOLN MANUFACTURING COMPANY, OF CONNERSVILLE, INDIANA, A CORPORATION OF INDIANA.

BRAKE.

Application filed September 9, 1922. Serial No. 587,091.

*To all whom it may concern:*

Be it known that I, NEIL S. LINCOLN, a citizen of the United States, residing at Connersville, in the county of Fayette and State of Indiana, have invented a new and useful Brake, of which the following is a specification.

It is the object of my invention to produce a simple and effective floating band-break, which when operated wraps itself upon the brake drum from either end of the band according to the direction of brake-drum rotation, can be quickly and easily mounted and demounted, and can be applied to existing Ford cars without interfering with the interanl brakes already on such cars and without requiring any machining on the car for installing, and when installed on a Ford car may be operated by the pedal which ordinarily operates a brake on the transmission shaft.

Figure 1:
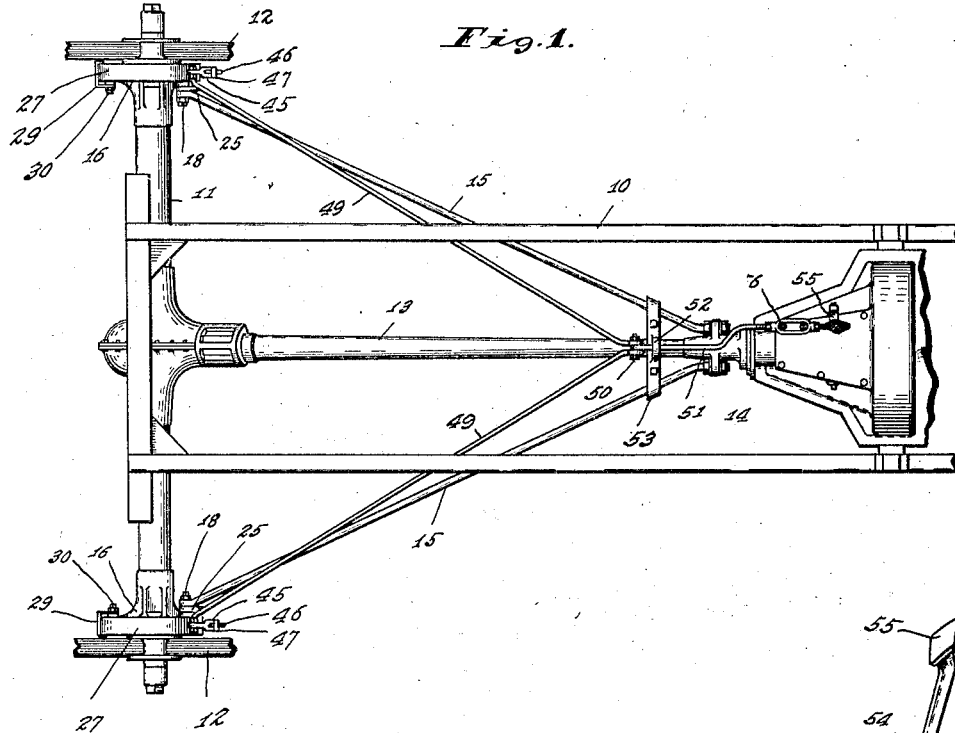
Figure 2:
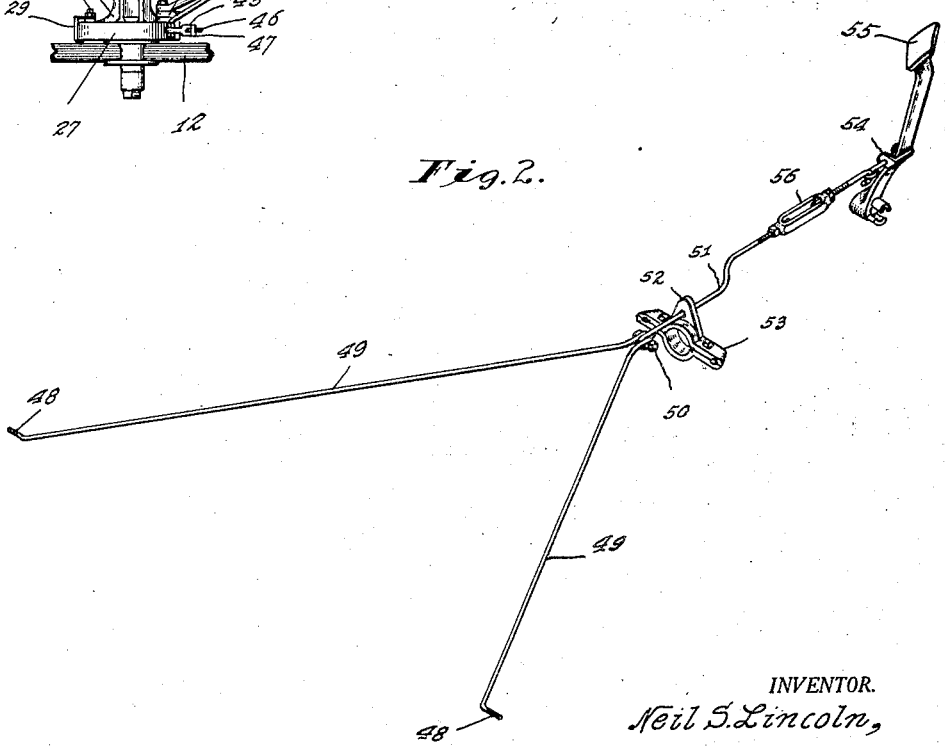

The accompanying drawings illustrate my invention: Fig. 1 is a fragmental view of an automobile chassis to which my band-brakes have been applied, the regular internal brakes and their operating mechanism being omitted for the sake of clearness; Fig. 2 is a perspective view of the operating mechanism for connecting my brakes to the operating pedal; Fig. 3 is a side elevation of one of my brakes, taken from the inside, with the rear axle and its casing in section; Fig. 4 is a plan of the structure shown in Fig. 3, with the brake in section on the line 4—4 of Fig. 3; Fig. 5 is a front view of the brake shown in Fig. 3, with the lugs on the band-ends and the parts mounted on said lugs in section; and Fig. 6 is a fragmental section on the line 6—6 of Fig. 4.

The chassis shown in Fig. 1 is the regular Ford chassis. The usual frame 10 has the usual rear-axle casing 11 at the ends of which are the usual rear wheels 12 (shown only fragmentally), and the usual torque tube 13 connects the rear-axle casing 11 to the usual variable-speed-transmission housing 14; and the usual torque rods 15 extend obliquely from the front end of the torque tube 13 to the internal-brake supports 16 which are mounted on the ends of the axle casing 11 to support the internal brakes which cooperate with the inner surfaces of the brake drums 17 on the rear wheels 12. The rear ends of the torque rods 15 are bifurcated to provide two separated fingers for mounting on the bolts 18 projecting inward at separated points from the brake supports 16. Between these two bolts 18 is the operating shaft 19 and operating arm 20 for the internal brake; but as the internal brake constitutes no part of my invention these operating parts therefor are the only parts of the internal brake which I have shown. All this is standard Ford construction.

On the bolts 18, which may be longer bolts substituted for the original bolts of the Ford car when such original bolts are too short. I mount on each brake support a main casting 25 for my external band-brake. This main casting 25 is clamped in place by the regular nuts on the bolts 18, and is notched at the rear so that it will not interfere with the operating shaft 19 of the internal brake. The casting 25 projects forward from its supporting bolts 18, and has an arc-shaped segment 26 which lies in front of the brake drum 17 but extends only a small angular distance around such brake drum, as is clear from Fig. 6. The segment 26 is spaced sufficiently far from the brake drum 17 to provide space for the external brake-band 27 with its lining 28 of friction material, and for sufficient clearance so that the brake will not drag when it is not set. The ends of the brake band do not quite meet, as is clear from Fig. 6; but save for this gap between its ends, the brake band extends all the way around the brake drum 17, and is exposed for the greater part of its length and free to take its natural position without interference. The rear part of the brake may be guided if desired by a guide finger 29, formed of an L-shaped piece of sheet metal mounted beneath the nut of the regular pivot bolt 30 for the segments of the internal brake; but this guide finger does not interfere with the circumferential movements of the brake band, and serves merely to prevent it from displacement axially in either direction, by having inturned parts 31 projecting inward past the edge of the brake band.

The ends of the brake band have riveted thereto supporting segments 35 provided with pairs of ears 36 and 37 respectively. These pairs of ears project outward through and beyond a medial slot 38 in the segment 26, the end walls of which slot form stops to limit the movement of the pairs of ears 36 away from each other and to serve as abutments from either of which the winding of the brake drum may start. These end walls are plane near the outside, on a radius of the brake drum, and the co-operating parts of the edges of the projecting ears 36 are likewise plane on the same radius (which is why the ears project as far outward as they do); so that as the ears are moved inward in the setting of the brake, they will move radially of the brake drum and will not wedge themselves between the brake drum and the end parts of the segments 26, as that would cause the brake to "grab." Guide walls 39 project radially forward from the two edges of the segment 26; and the slot 38 may be narrower than the clear space between such walls 39, so that on each side of said slot 38 between the walls 39 there is a ledge 40 projecting toward the corresponding ledge from the other wall, as is clear from Figs. 4 and 5.

The pairs of ears 36 and 37 carry pivot pins 41 and 42 respectively. The pin 41 may be of greater length than the width of the slot 38, so that its ends ride on the ledges 40; but the length of the pin 42 is substantially the same as the width of the slot 38 so that it will pass through such slot while the pin 41 will not. That end of the brake band 27 which carries the ears 37 and pivot pin 42 can therefore be removed by drawing the pin 42 inward through the slot 38, after first taking off the casting 25. The other end of the brake band, carrying the ears 36 and the pivot pin 41, cannot be so removed while the pin 41 is in place when such pin is of the length shown. To remove such pin 41, the guide walls 39 are provided at about their middles with holes 43 and 44 through them, the hole 43 being sufficiently large to permit and the hole 44 sufficiently small to prevent the passage of the pivot pin 41 therethrough, but the two holes being in line so that the pin 41 may be driven out through the hole 43 by a smaller-diameter push or punch insertable through the hole 44. The lengths of the ends of the brake band 27 are such, however, that they will not permit the pivot pin 41 to come into line with the holes 43 and 44 until the ears 37 have first been removed from the slot 38, as such band-ends engage on a smaller angular approach of the ears 36 and 37 than is necessary to get either pivot pin 44 or 42 into alinement with the holes 43 and 44.

A brake-setting lever 45 is mounted on the pivot pin 41 of each brake, and is preferably bent as shown in Fig. 3 to get its upper end substantially over its lower or pivotal end. An eye-bolt 46 is pivoted on the pivot pin 42, and projects through a V-shaped hole in the lever 45. On the other end of the eye-bolt 46 from the pivot pin 42 is a nut 47, which is V-shaped on its face toward the lever 45 and rests in a flatter V-shaped notch 47' in the edge of such lever. This provides a knife-edge fulcrum between the nut 47 and the lever 45, and serves also as a nut-lock preventing accidental displacement of such nut.

The upper or free end of each lever 45 receives the out-turned rear end 48 of an oblique brake-rod 49 which at its forward end is provided with an eye for receiving a pivot bolt 50 which connects the brake rods 49 from each brake to a common brake rod 51. The brake rod 51 is guided by passing through an upstanding flange 52 in a two-part clamp 53 which clamps on the torque tube 13 and torque rods 15, and which can only be mounted in a predetermined position because of the obliqueness between the torque tube 13 and torque rods 15, as is clear from Figs. 1 and 2. The forward end of the brake rod 51 has a hook-eye connection to a clamp 54 on the regular brake pedal 55, which is the only one of the pedals I have shown since it is the only one with which this invention is concerned. The brake rod 51 is provided with a turn-buckle 56 for the adjustment of its length.

In operation, when the pedal 55 is depressed the two brake rods 49 are drawn forward, and there is sufficient play in their connection to the bolt 50 to permit the necessary equalization between the two brakes. In each brake, the drawing forward of the rod 49 tilts forward the upper end of the lever 45; which acts through the notch 47' and nut 47 and eye-bolt 46 to cause the two pivot bolts 41 and 42 to be drawn together. This brings the brake band 27 closer inward toward the brake drum 17, until it touches at some one or more points, whereupon the dragging of the brake drum forces one or the other of the pairs of ears 36 and 37 against its end of the slot 38, according to whether the wheels 12 are going forward or backward, and from this brake-end carrying this pair of ears causes the winding up of the brake band on the drum by the rotation of the drum. This makes the setting of the brakes very easy, so that the force required for setting the brakes is reduced to a minimum, and it acts for the full length of the brake band for either direction of rotation of the brake drum. This setting action is not interfered with by any casing of the brake band, and neither is the releasing of the brakes which occurs when the pedal 55 is released, upon which releasing the spring expansion of the brake band separates from the brake drum.

I claim as my invention:

1. An external brake for automobiles, comprising a supporting member for mounting on a brake support, a brake band associated with said supporting member and having free ends at said supporting member, a pivot ear carried by one of said free ends, said member having flanges overlying the slides of said pivot ear, a pivot pin in said pivot ear, one of said flanges having a hole therethrough to permit the ready removal of said pivot pin when said pivot pin and said hole are alined, and means interconnecting said pivot pin and the other end of said brake band and operable to draw the two ends of the brake together.

2. In a floating brake, a brake drum, an axle casing and a brake support on the end of said axle casing, in combination with an arc-shaped member mounted on said brake support and overlying the brake drum, a brake band surrounding the brake drum, said brake band having free ends within said arc-shaped member, a lever pivoted to one of said free ends, and a link connecting said lever to the other of said free ends, said link comprising an eye-bolt with a nut thereon, and said nut being provided with a V-shaped face which engages said lever in a flatter V-shaped notch in the latter.

3. In a floating brake, a brake drum, an axle casing and a brake support on the end of said axle casing, in combination with an arc-shaped member mounted on said brake support and overlying the brake drum, a brake band surrounding the brake drum, said brake band having free ends within said arc-shaped member, a lever pivoted to one of said free ends, and a link connecting said lever to the other of said free ends, said link comprising an eye-bolt with a nut thereon, and said nut being provided with a V-shaped face which engages said lever.

4. An external brake for automobiles, comprising a supporting member for mounting on a brake support, a brake band associated with said supporting member and having free ends at said supporting member, pivot ears carried by the respective free ends, said member having flanges overlying the sides of said pivot ears, pivot pins in said pivot ears, one of said flanges having a hole therethrough to permit the ready removal of one of said pivot pins when said pivot pin and said hole are alined, and means interconnecting said pivot pins and operable to draw the two ends of the brake together.

5. An external brake, comprising a member arranged for mounting on a brake support, a brake band having free ends within said member, a lever pivoted to one of said free ends and an eye-bolt pivoted to the other, and a nut on said eye-bolt having a V-shaped face engaging said lever to form a fulcrum connection between them.

6. An external brake, comprising a member arranged for mounting on a brake-support, a brake band having free ends within said member, a lever pivoted to one of said free ends and an eye-bolt pivoted to the other, and a nut on said eye-bolt having a V-shaped face engaging said lever to form a fulcrum connection between them, said lever being provided with a flatter V-shaped notch for receiving said V-shaped nut-face.

7. An external brake for automobiles, comprising a supporting member for mounting on a brake support, a brake band associated with said support and having free ends at said support, pivot ears carried by the respective free ends, means interconnecting said pivot ears and operable to draw them together to set the brake, said connecting means being connected to said ears by pivot pins, and ledges on said member on which one of said pivot pins rides.

8. An external brake for automobiles, comprising a supporting member for mounting on a brake support, a brake band associated with said supporting member and having free ends at said supporting member, pivot ears carried by the respective free ends, said member being provided with a slot through which said pivot ears project and ledges projecting toward each other at the sides of said slot, pivot pins in said pivot ears, one of said pivot pins being sufficiently long so it rides on said ledges and is prevented from passing through said slot and the other of said pivot pins being sufficiently short so that it will pass through said slot, and means interconnecting said pivot pins and operable to draw the two ends of the brake band together.

9. An external brake for automobiles, comprising a supporting member for mounting on a brake support, a brake band associated with said supporting member and having free ends at said supporting member pivot ears carried by the respective free ends, said member being provided with a slot through which said pivot ears project and ledges projecting toward each other at the sides of said slot, pivot pins in said pivot ears, one of said pivot pins being sufficiently long so it rides on said ledges and is prevented from passing through said slot, and means interconnecting said pivot pins and operable to draw the two ends of the brake band together.

10. An external brake for automobiles, comprising a supporting member for mounting on a brake support, a brake band associated with said supporting member and having free ends at said supporting member, pivot ears carried by the respective free ends, said member being provided with a slot through which said pivot ears project and ledges projecting toward each other at the sides of said slot, pivot pins in said pivot ears, one of said pivot pins being sufficiently long so it rides on said ledges and is prevented from passing through said slot and the other of said pivot pins being sufficiently short so that it will pass through said slot, and means interconnecting said pivot pins and operable to draw the two ends of the brake band together, said member being provided with walls projecting past the ends of said pivot pins and one of said walls being provided with a hole through which the longer pivot pin may be inserted and withdrawn, said hole being located so that neither pin can be brought into alinement with it while both sets of ears are in the slot.

11. An external brake for automobiles, comprising a supporting member for mounting on a brake support, a brake band associated with said supporting member and having free ends at said supporting member, pivot ears carried by the respective free ends, said member being provided with a slot through which said pivot ears project and ledges projecting toward each other at the sides of said slot, pivot pins in said pivot ears, one of said pivot pins being sufficiently long so it rides on said ledges and is prevented from passing through said slot, and means interconnecting said pivot pins and operable to draw the two ends of the brake band together, said member being provided with walls projecting past the ends of said pivot pins and one of said walls being provided with a hole through which the longer pivot pin may be inserted and withdrawn, said hole being located so that neither pin can be brought into alinement with it while both sets of ears are in the slot.

12. An external brake for automobiles, comprising a supporting member for mounting on a brake support, a brake band associated with said supporting member and having free ends at said supporting member, pivot ears carried by the respective free ends, said member being provided with a slot through which said pivot ears project and ledges projecting toward each other at the sides of said slot, pivot pins in said pivot ears, one of said pivot pins being sufficiently long so it rides on said ledges and is prevented from passing through said slot and the other of said pivot pins being sufficiently short so that it will pass through said slot, and means interconnecting said pivot pins and operable to draw the two ends of the brake band together, said member being provided with walls projecting past the ends of said pivot pins.

13. An external brake for automobiles, comprising a supporting member for mounting on a brake support, a brake band associated with said supporting member and having free ends at said supporting member, pivot ears carried by the respective free ends, said member being provided with a slot through which said pivot ears project and ledges toward each other at the sides of said slot, pivot pins in said pivot ears, one of said pivot pins being sufficiently long so it rides on said ledges and is prevented from passing through said slot, and means interconnecting said pivot pins and operable to draw the two ends of the brake band together, said member being provided with walls projecting past the ends of said pivot pins.

In witness whereof, I have hereunto set my hand at Indianapolis, Indiana, this 5th day of September, A. D. one thousand nine hundred and twenty two.

NEIL S. LINCOLN.